No. 663,175. Patented Dec. 4, 1900.
T. J. KETCHAM.
WHEEL AND TIRE.
(Application filed Sept. 21, 1897.)

(No Model.)

WITNESSES:
Fred White
Thomas F. Wallace

INVENTOR:
Thomas J. Ketcham,
By his Attorneys.
Arthur C. Fraser & Co.

UNITED STATES PATENT OFFICE.

THOMAS J. KETCHAM, OF MATAMORAS, PENNSYLVANIA.

WHEEL AND TIRE.

SPECIFICATION forming part of Letters Patent No. 663,175, dated December 4, 1900.

Application filed September 21, 1897. Serial No. 652,430. (No model.)

*To all whom it may concern:*

Be it known that I, THOMAS J. KETCHAM, a citizen of the United States, residing at Matamoras, in the county of Pike and State of Pennsylvania, have invented certain new and useful Improvements in Wheels and Tires, of which the following is a specification.

This invention relates to wheels and tires, and especially to cushioning or elastic wheels and tires, such as employed for cycles, motor-carriages, and the like.

Many attempts have heretofore been made to provide a wheel or tire suitably yielding and elastic which should be proof against punctures and durable in use. The employment of pneumatic tires and of rubber cushion-tires, while attaining elasticity, has been subject to the disadvantages that the tires were soon impaired by wear and always susceptible to being punctured. My invention aims to provide a durable and puncture-proof tire which shall be sufficiently elastic to possess the cushioning advantages of a pneumatic tire and sufficiently strong and durable to resist wear and puncture.

In carrying out the preferred form of my invention I provide an elastic tire of spring-steel or other suitable material, a rigid felly of wood or other suitable material within and of considerably less diameter than the tire, so as to leave an annular space between the two, and leaf-springs attached at their middles to the one part and extending at their ends outwardly to and movably engaging the other part at separated points, and I construct the tire and felly to be independently movable relatively to each other both radially and circumferentially to predetermined extents, and I provide certain structural features of improvement and an improved traction device, all of which will be hereinafter more fully set forth.

Figure 1:
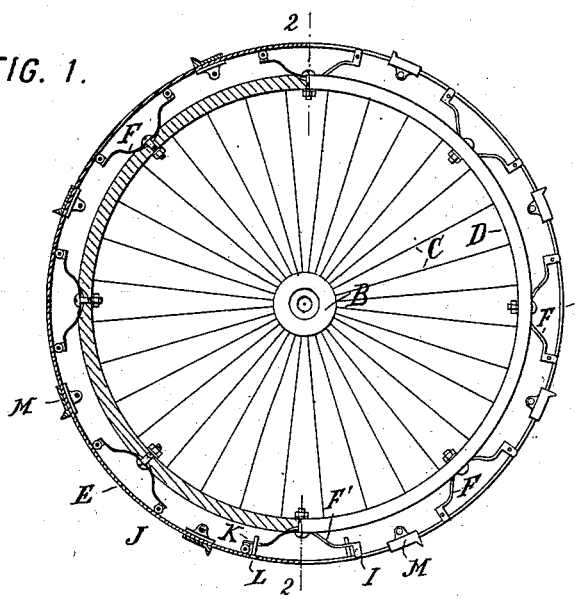
Figure 2:
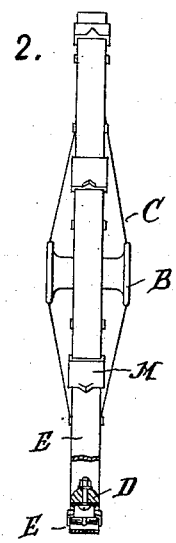
Figure 3:
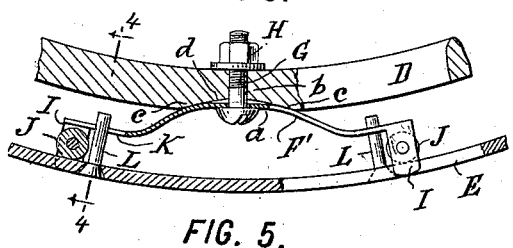
Figure 4:
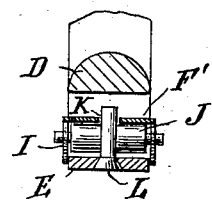
Figure 5:
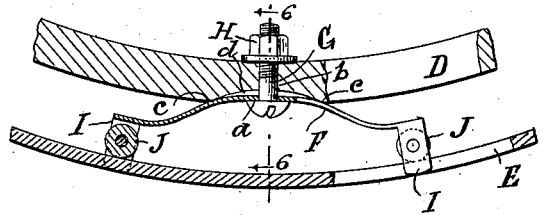
Figure 6:
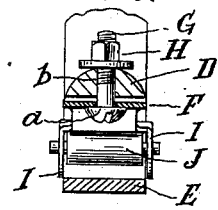
Figure 7:
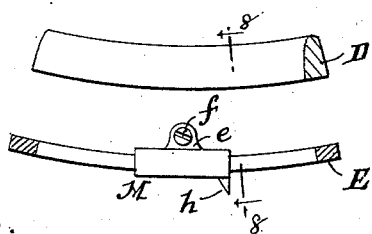
Figure 8:
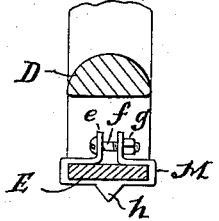

In the accompanping drawings, Figure 1 is a side elevation, partly in mid-section, of a suspension or bicycle wheel provided with the preferred form of my improvements. Fig. 2 is an edge view thereof, partly in section. Fig. 3 is an enlarged fragmentary side elevation, partly in section, showing the stops for limiting creeping; and Fig. 4 is a cross-section thereof on the line 4 4 looking in the direction of the arrow. Fig. 5 is a view like Fig. 3, but showing one of the other springs; and Fig. 6 is a cross-section thereof on the line 6 6. Fig. 7 is a fragmentary side elevation showing the traction-clamp applied to the tire, and Fig. 8 is a cross-section thereof on the line 8 8.

Referring to the drawings, let A indicate a suspension-wheel; B, its hub; C, the spokes; D, the felly, and E the rim or tire. These parts may be of any usual or suitable construction or material.

According to my invention the tire E consists of a thin endless strip of elastic material, as suitably-tempered steel, aluminium, or other metal, of considerably greater diameter than the wooden or other felly D and concentric therewith but spaced apart therefrom, so that a considerable annular space exists between the felly and tire, springs F being connected to one of said parts and extending across the space to the other of said parts for elastically holding them together and in their relative positions. The springs F are preferably leaf-springs connected at their middles by bolts G and nuts H to the felly D and loosely engaging at their separated ends the tire E, to which they are connected in any suitable manner to give a sliding and guiding engagement between the springs and tire. The connection shown for each spring F consists of downturned ears I, formed on each end of the spring and embracing the sides of the tire E for guiding the latter from the spring, which ears have pivoted between them antifriction-rollers J, bearing on the inner face of the tire E and transmitting the tension of the spring thereto. Thus as the spring is compressed its ends can roll outwardly on the tire. One spring F' is connected to the tire to limit the movement of the latter relatively to the felly. This connection is preferably formed by providing slots K in the spring and projections L on the tire entering these slots and freely movable therein during the normal limits of movement of the tire relatively to the felly, but engaged by the ends of the slots or otherwise suitably prevented from further movement when the limit of such movement is reached. As shown, the projections L are fixed pins, which strike the end of the slot K when the tire moves in one direction and strike the roller J when it moves in the other direction.

Preferably each spring is provided with a central hole $a$, and the felly has a corresponding hole $b$ for the bolt G. Adjustment of the spring by the bolt to vary the tension may be effected by leaving a space between the center of the spring and the adjacent wall of the felly. As shown, the wall of the felly is constructed with bearings $c$ remote from the hole $b$ and with a convex wall $d$ adjacent to this hole, so that by setting up the nut H the center of the spring is drawn inward toward the wall $d$, thus giving the ends of the spring a greater tendency to expand outward against the tire. In this or any other suitable manner the tension of the springs can be equalized or adjusted for different parts of the tire.

For increasing the traction of the wheel I provide a traction device M, which may be applied to or removed from the tire at will and is preferably applied thereto between the adjacent ends of the springs F. This consists of a sheet-metal piece folded around the thin rectangular tire and having perforated bent ends $e$, traversed by a bolt $f$ and drawn together by screwing a nut $g$ on the bolt. The clamp has a spur $h$ or other suitable portion which will suffice to penetrate the roadway and give sufficient tractive adhesion for the wheel in case it is to be used on ice or snow. The clamps can be applied or removed at will and being of short length and little depth will not materially affect the elasticity of the tire.

The tire is preferably thin and flat and of rectangular cross-section, as I find this the most elastic form for it.

In operation the tire is itself flattened at a point where it bears on the road and is also forced inwardly or radially toward the felly at this point, the springs being more or less compressed, so that the tire is in use slightly eccentric of the axis of the wheel. The resiliency of the tire itself and of the springs restores the tire to its proper position as fast as the point of load changes. The antifriction connection between the tire and springs permits easy flexure of the springs and facilitates a slight creeping of the tire around the felly as the two are relatively displaced, the connection between the spring F' and the tire serving to limit this creeping and restore the parts to position. The flexibility of the tire enables it to yield to the traction devices, as these contact with the roadway, so that no perceptible elevation of the hub is noticeable with the use of these.

It will be seen that my invention provides improvements which can be readily and advantageously availed of, and it will be understood that the invention is not limited to the particular details of construction and arrangement set forth as constituting its preferred form, since it can be employed according to such modifications as circumstances or the judgment of those skilled in the art may dictate without departing from the spirit of the invention.

What I claim is—

1. In tires for wheels, the combination with a felly D having a hole $b$ and faces $c$, of a tire E spaced apart from said felly, and a spring F connected at its ends to said tire, crossing the space between the latter and said felly, bearing on the faces $c$ of the latter, and having a hole $a$ opposite said hole $b$, and a bolt G traversing said holes and adjustable therein to connect said spring to said felly, and to adjust the tension of the spring by flexing it between said faces $c$.

2. For wheel-tires, the combination with a felly D, of a spring F connected at its middle thereto, and a tire E spaced apart from and movable circumferentially of said felly and connected thereto by said spring, said spring having antifriction-rollers J at its ends transmitting its tension to said tire and carrying the tire movably longitudinally relatively to the springs.

3. In wheels, the combination with a felly, of a tire spaced apart therefrom, springs F connected at their middles to said felly and at their ends to said tire, stops limiting the movement of the tire on the springs, said springs having outturned ears I embracing the sides of said tire and movably connecting the latter to the felly and rollers J held by said ears between the springs and tire.

4. In wheels, a felly D, in combination with a tire E spaced apart from and movable circumferentially relatively to the felly, a spring between said felly and tire supporting the tire elastically and movably from the felly and movably connected to the tire, and a connection between the spring and the tire limiting movement of the tire circumferentially relatively to the felly and antifriction-rollers between the spring and tire facilitating movement of the latter.

In witness whereof I have hereunto signed my name in the presence of two subscribing witnesses.

THOMAS J. KETCHAM.

Witnesses:
 ELIZABETH M. BARNUM,
 JOHN BALMORE.